J. E. WEBSTER.
ELECTRIC MOTOR SUSPENSION.
APPLICATION FILED APR. 12, 1907.
905,964.
Patented Dec. 8, 1908.
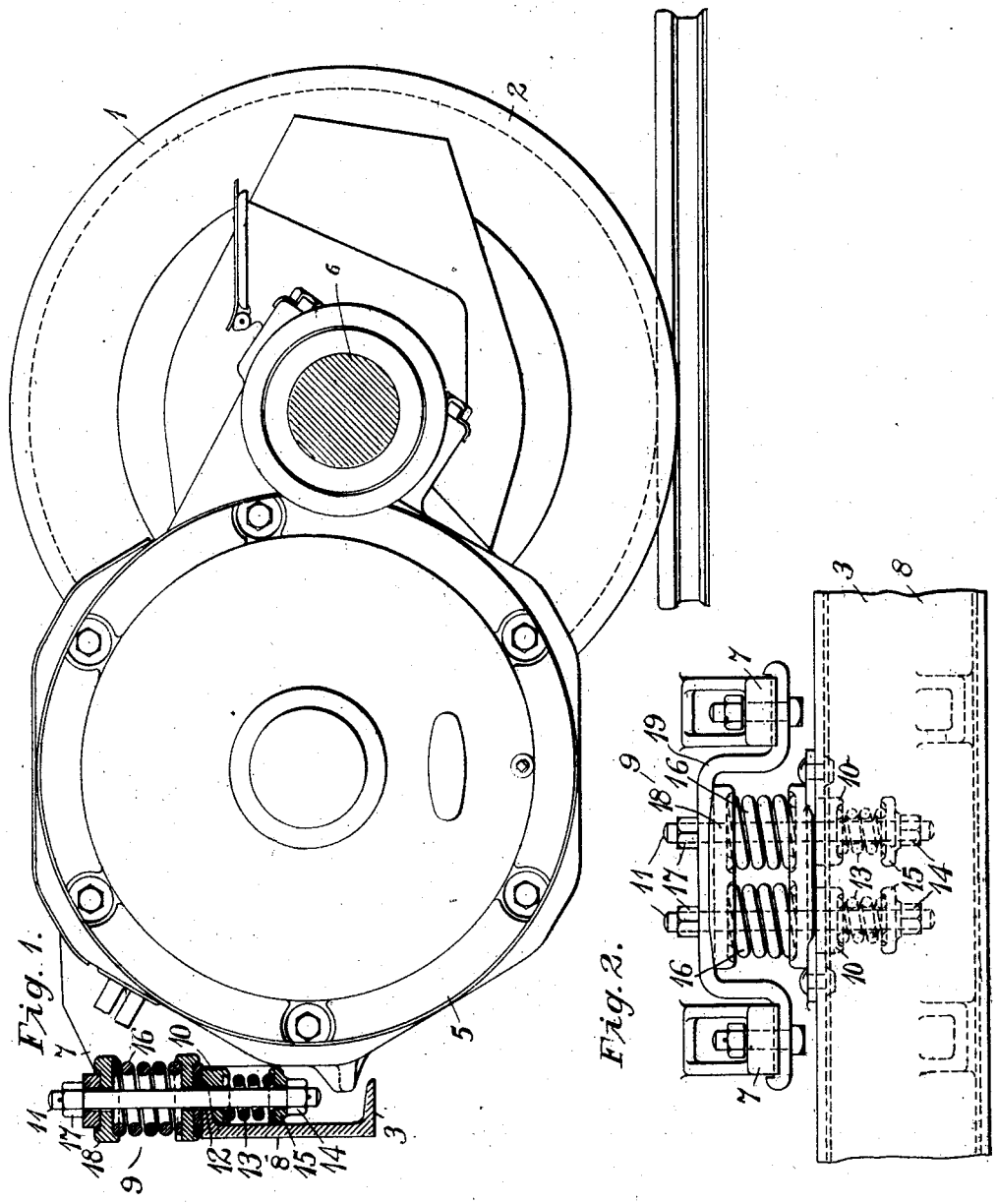
WITNESSES:
Fred H. Miller
R. J. Dearborn
INVENTOR
John E. Webster
BY
Wesley G. Carr
ATTORNEYS

UNITED STATES PATENT OFFICE.

JOHN E. WEBSTER, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC-MOTOR SUSPENSION.

No. 905,964.     Specification of Letters Patent.     Patented Dec. 8, 1908.

Application filed April 12, 1907. Serial No. 367,876.

*To all whom it may concern:*

Be it known that I, JOHN E. WEBSTER, a citizen of the United States, and a resident of Pittsburg, in the county of Allegheny and State of Pennsylvania, have invented a new and useful Improvement in Electric-Motor Suspension, of which the following is a specification.

My invention relates to the suspension of driving motors upon the trucks of railway cars or other vehicles and it has for its object to provide adequate means for preventing a vibratory motion between the portions of the driving motors which are attached to or rest upon the truck frame and the portions of the truck engaged thereby that shall be simple and durable in construction and which may be readily applied to well known forms of motor suspension.

There are several well known methods of suspending electric vehicle motors from their trucks, among which is the so called "nose suspension." According to this method, the motor frame, which constitutes an inclosing casing, is pivotally mounted upon one axle of the truck and is provided with a nose or projection, or a plurality of such parts, at its opposite side to rest upon one or more ledges or shelves with which a cross-beam of the truck frame is provided, and since the truck frame is mounted upon springs, a flexible suspension is in this way provided for the motor.

In fastening the motor projections to the portion of the truck frame upon which they rest, provision must be made for a certain amount of lost motion, since the truck frame may move in substantially vertical lines, independently of the axles, while such motion produces a rotative motion of the motors about the center lines of the axles upon which they are mounted. When the vehicle is in operation, the truck frames are constantly vibrating as the vehicle wheels pass over irregularities in the road or joints in the track and, as heretofore mounted, the projections on the motor continually chattered and hammered against the cross-beams upon which they rested.

Vehicle motors, in general, are relatively heavy, so that the hammering just referred to tends to injure the truck frame and to so wear away the motor projections as to permit an increased chatter which constitutes a source of discomfort or positive annoyance to the passengers.

In Patent No. 829,557, granted August 28, 1906, to the Westinghouse Electric & Manufacturing Company as my assignee, I have shown and described means for obviating these undesirable features. According to the aforesaid invention, I applied a spring in such a way as to exert a pressure upon the projection of the motor frame for the purpose of keeping it constantly in engagement with the truck frame. According to my present invention, I provide still further improved means for securing the motor projections to the truck frame whereby a number of distinct advantages, which are hereinafter pointed out, may be obtained.

My invention is illustrated in the accompanying drawing, in which

Figure 1 is a view, mainly in elevation but partially in section, of a railway vehicle truck which is equipped with electric motors suspended in accordance with my invention, and Fig. 2 is a detail view in which the spring support of my invention is more fully disclosed.

Referring to the drawings, a railway vehicle truck 1 comprises suitable axles to which wheels 2 are rigidly attached and a truck frame 3, which is flexibly mounted upon a plurality of bearings (not shown) that engage the axle. An electric motor 5 is pivotally mounted upon one of the axles 6 and the inner end of its frame which extends towards the center of the truck is provided with projections 7, by which one end of the motor is supported from a cross-beam 8 of the truck frame.

A spring structure 9 is interposed between the projections 7 and the cross-beam 8 and is so arranged as to permit a slight rotary movement of the motor relative to the axle 6 on which it is pivotally mounted, in either direction, without permitting a direct contact between the motor projections and the truck beam. The spring structure 9 comprises a block 10, which is riveted or otherwise permanently secured to the beam 8, bolts 11, which extend loosely through holes 12 in the block 10, helical springs 13, which surround the lower ends of the bolts 11 and are held in place by nuts 14 and caps 15, and helical springs 16 which surround the upper ends of the bolts 11 and are held in place by nuts 17 and a block 18. The springs 13 and 16 act in opposition to each other and are held under compression by the nuts 14 and 17 which are screwed upon the ends of the bolts 11. The spring support is also provided with a cross bar or yoke 19 the ends of which may be offset to receive the projections 7 of the motor frame.

It will be readily understood that the spring structure serves not only as a resilient support for that portion of the weight of the motor which is received by the projections 7 but also resiliently secures these projections to the truck frame. By this means, the wearing of the motor projections from a rolling contact with the cross-beam of the truck frame is avoided and, furthermore, the motor may be readily removed for repairs and reattached to the spring structure 9, since the two groups of springs oppose each other and are always held under compression. The cross-beam 8 of the truck frame may be of any suitable form, a channel beam being shown in the drawings as illustrative of the usual practice.

Variations in size and arrangement of details may, of course, be effected within the scope of my invention.

I claim as my invention:

1. The combination with a vehicle truck, an electric motor pivotally mounted upon an axle of the truck and having projections at one side of its frame, of a laterally projecting yoke to the ends of which said projections are clamped, a pair of coil springs interposed between the middle portion of the yoke and the truck frame, a second pair of coil springs beneath the truck frame, and bolts clamping said springs, yoke and truck frame together.

2. The combination with a vehicle truck, an electric motor pivotally mounted on an axle of the truck, and having projections at one side of its frame, of a yoke to the ends of which said projections are clamped, and two pairs of coil springs between which a truck frame member is clamped and to one of which said yoke is clamped.

3. The combination with a vehicle truck, an electric motor pivotally mounted upon an axle of the truck, and having projections at one side of its frame, of a resilient frame interposed between the projection and the truck frame and comprising two sets of opposing springs and a laterally projecting yoke to the ends of which the motor projections are clamped.

4. The combination with a vehicle truck, and an electric motor pivotally mounted upon an axle of the truck and having projections at one side of its frame, of two pairs of opposing springs located respectively above and below a truck frame cross beam and held under compression, and a yoke clamped to the upper ends of the upper springs and supporting the motor projections at its ends.

5. The combination with a vehicle truck, and an electric motor pivotally mounted upon an axle of the truck and having a projection at one side of its frame, of a ledge on the truck frame, opposing springs on opposite sides of the ledge, means independent of the truck frame for compressing the springs, and means for attaching the motor projection to the outer end of one spring group.

6. The combination with a vehicle truck, and an electric motor pivotally mounted upon an axle of the truck and having a projection at one side of its frame, of a ledge on the truck frame, helical springs on opposite sides of the ledge, bolts that project loosely through holes in the ledge to hold the springs under compression, and means for attaching the motor projection to the outer ends of one spring group.

In testimony whereof, I have hereunto subscribed my name this 30th day of March, 1907.

JOHN E. WEBSTER.

Witnesses:
JOHN COUTS DAVIS,
BIRNEY HINES.